United States Patent
Viswanathan et al.

(10) Patent No.: US 10,147,066 B2
(45) Date of Patent: Dec. 4, 2018

(54) BUSINESS PROCESS FRAMEWORK

(71) Applicant: Bank of America Corporation, Charlotte, NC (US)

(72) Inventors: Mohana K. Viswanathan, Princeton, NJ (US); Sundar Krishnamoorthy, E. Windsor, NJ (US); Suresh G. Nair, Robbinsville, NJ (US)

(73) Assignee: Bank of America Corporation, Charlotte, NC (US)

( * ) Notice: Subject to any disclaimer, the term of this patent is extended or adjusted under 35 U.S.C. 154(b) by 963 days.

(21) Appl. No.: 14/504,976

(22) Filed: Oct. 2, 2014

(65) Prior Publication Data
US 2016/0098661 A1 Apr. 7, 2016

(51) Int. Cl.
*G06Q 10/00* (2012.01)
*G06Q 10/06* (2012.01)

(52) U.S. Cl.
CPC ..... *G06Q 10/067* (2013.01); *G06Q 10/06316* (2013.01); *G06Q 10/0639* (2013.01)

(58) Field of Classification Search
CPC ............. G06Q 10/063; G06Q 10/0631; G06Q 10/06316; G06Q 10/06375; G06Q 10/0639; G06Q 10/067
See application file for complete search history.

(56) References Cited

U.S. PATENT DOCUMENTS

| | | | | |
|---|---|---|---|---|
| 2005/0246522 A1* | 11/2005 | Samuelsson | ............ | G06F 21/53 713/150 |
| 2006/0020641 A1* | 1/2006 | Walsh | ................... | G06Q 10/10 |
| 2008/0320486 A1* | 12/2008 | Bose | ..................... | G06Q 10/06 718/105 |
| 2010/0005472 A1* | 1/2010 | Krishnaraj | ............ | G06F 9/5038 718/104 |
| 2010/0174583 A1* | 7/2010 | Passova | ............... | G06Q 10/063 705/7.11 |

(Continued)

OTHER PUBLICATIONS

Richard J.D. Collard, IBM Software, Impact2010, The Premier Conference for Business and IT Leaders, Business Rules Managing Complex Decisions in your Organisation—Simply, 2010, 37 pages.

(Continued)

*Primary Examiner* — William S Brockington, III
(74) *Attorney, Agent, or Firm* — Banner & Witcoff, Ltd.; Michael A. Springs

(57) ABSTRACT

A business process framework (BPF) may be used to provide a vendor agnostic interface to allow one or more business users to design, deploy, test and/or monitor an operation of one or more business processes using a common user interface. The BPF may allow a user access to a business process management (BPM) system using a common interface, regardless of a vendor or version of BPM system being used by a business organization. The BPF may include a business process modeling interface allowing the business user to model, via the common user interface, regardless of the version or vendor of the BPM system product being used. The BPF may also include an execution interface capable of communicating with an execution engine included in different BRMS products. The execution interface may include a translator to translate a business model into a format compatible with each of a plurality of execution engines.

17 Claims, 11 Drawing Sheets

(56) References Cited

U.S. PATENT DOCUMENTS

| | | | | |
|---|---|---|---|---|
| 2011/0029577 A1* | 2/2011 | Notani | ............... | G06F 17/3056 |
| | | | | 707/804 |
| 2012/0030573 A1* | 2/2012 | Balko | ...................... | G06F 8/34 |
| | | | | 715/735 |
| 2013/0018702 A1* | 1/2013 | Smith | ................... | G06Q 10/06 |
| | | | | 705/7.36 |

OTHER PUBLICATIONS

TIBCO Software Inc., BusinessWorks ProcessMonitor, (Retrieved Sep. 24, 2014), http://www.tibco.com/products/automation/application-integration/activematrix-businessworks/businessworks-processmonitor, © 2014 TIBCO Software Inc., 2 pages.

Gartner, State of Florida Agency for Health Care Administration (ACHA) "Modernization Using a Business Rules Management System (BRMS)," Dec. 16, 2012, 8 pages.

IBM WebSphere ILOG BRMS Release 7.1, Business Rule Management System, © 2010 IBM Corporation, 71 pages.

InfoTrellis, Business Rule Solutions, LLC, Smart BRMS™ Methodology, Improve Business Performance by Optimizing the Rules of Business Operation, © InfoTrellis Business Rule Solutions, (Retrieved Sep. 24, 2014), 11 pages.

Dorothy Russel, An architectural introduction to Business Rules, IRMAC—Feb. 19, 2003, © 2003 Dorothy Russel, 44 pages.

Cathy Dew & Leo Fernig, Kuali Foundation®, Building the Kuali Student BRMS (Business Rules Management System), Chicago, May 13-14, 2008, 39 pages.

TIBCO iProcess® Engine: Architecture Guide, Software Release 11.4, Jul. 2013, 153 pages.

What is business process management (BPM)?—Definition from WhatIs.com, Essential Guide SOA BPM guide: Mobile, cloud drive BPM, BPEL changes, posted by Margaret Rouse, Editorial Director, (Retrieved Sep. 29, 2014), http://searchcio.techtarget.com/definition/business-process-management, © 2007-2014 Tech Target, 7 pages.

* cited by examiner

Legend:

Install all BPF components.3 appserver products and 2 DB products — 310

The process is modeled and deployed to iPROCESS. MER files are created and deployed to iPE to define the message types. — 320

3 XML schemas are used to Prime the BPF DB Scriptgen tool is used to convert the XML to SQL. — 330

The MLBF webservice can be called from UI, MT or BW servers. — 34x

Except for Query and Next APIs, BPF makes SSO calls to iPE node.

BPF SYNC services listens to the EMS queue created for BPF, — 350
and the messages in the queue are based on the MER file deployed earlier. — 355

Query and Next APIs return the workitems from the BPF database on the group and acl defined earlier. — 360

FIG. 3 (Cont.)

BUSINESS PROCESS FRAMEWORK

BACKGROUND

A business organization, such as a financial institution, an insurance provider, a healthcare organization, a utility, and/or the like, an educational institution, or a governmental organization may define one or more processes for defining the structure of business operations across different business units. For example, these processes may be used to control the operation of the business organization by defining methods by which the business organization, and its underlying business units, operate. In practice, the business processes may be used by the business organization to ensure consistent operation across the enterprise.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

A business process framework may be used to provide a vendor agnostic interface to allow one or more business users to design, deploy, test and/or monitor an operation of one or more business processes using a common user interface. The business process framework may allow a user access to a business process management (BPM) system using a common interface, regardless of a vendor or version of BPM system being used by a business organization. The business process framework may include a business process modeling interface allowing the business user with the common user interface to a modeler included with the BPM system, regardless of the version or vendor of the BPM system product being used. The business process framework may also include an execution interface capable of communicating with an execution engine included in different BRMS products. In some cases, the execution interface may include a translator to translate a business model into a format compatible with each of a plurality of execution engines.

In some embodiments, a method for providing a vendor agnostic user experience for modeling and executing models of a plurality of business processes may include presenting, by a user interface of a business process framework (BPF), at least one user interface screen to facilitate entry of information corresponding to an operation of a business process. The business process framework may further generate, by a model interface device, a standardized representation of the business process using business process modeling notation (BPMN) and XML process definition language (XPDL). The BPF may further communicate the standardized representation of the business process to a modeler device of a business process management (BPM) system, wherein the BPF comprises a wrapper around the operation of the BPM system and provides a vendor agnostic user interface to the BPM system and trigger, by an execution interface of the BPF, an execution engine of the BPM to process the business process model. Further, the BPF may further provide, one or more user interface screens compris-ing a set of business process metrics corresponding to the operation of the business process model when executed by the execution engine.

In some embodiments, a business process framework (BPF) device may be configured to provide a consistent interface for managing business processes across a business organization. In doing so, the business process framework may be communicatively coupled to a business process management (BPM) system configured to manage operation of a plurality of business processes. The business process management system may comprise an execution engine for processing models corresponding to the plurality of business models. The BPF may include a processor and a non-transitory memory device communicatively coupled to the processor and storing instructions that, when executed by the processor, cause the BPF device to at least generate, via a modelling interface, at least one user interface screen to facilitate entry of business process information corresponding to a business process. The BPF may further generate, by the modeling interface, a representation of the business process in a modeling language based on the business process information and trigger, via a model execution device, execution of a business process model by the execution engine of the BPM system wherein the business process model is based on the representation of the business process generated by the modeling interface.

In some embodiments, a system may include a business process management (BPM) system configured to manage operation of a plurality of business processes. The business process management system may include an execution engine for processing models corresponding to the plurality of business models. The system may further include a business process framework (BPF) device configured to provide a consistent interface for managing business processes across a business organization. The business process framework may include a wrapper around the operation of the business process management system. The BPF may include a processor and a non-transitory memory device communicatively coupled to the processor and storing instructions that, when executed by the processor, cause the BPF device to at least generate, via a modelling interface, at least one user interface screen to facilitate entry of business process information corresponding to a business process and generate, by the modeling interface, a representation of the business process in a modeling language based on the business process information. In some cases, the BPF may further be configured to trigger, via a model execution device, execution of a business process model by the execution engine of the BPM system wherein the business process model is based on the representation of the business process generated by the modeling interface.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

Figure 1:
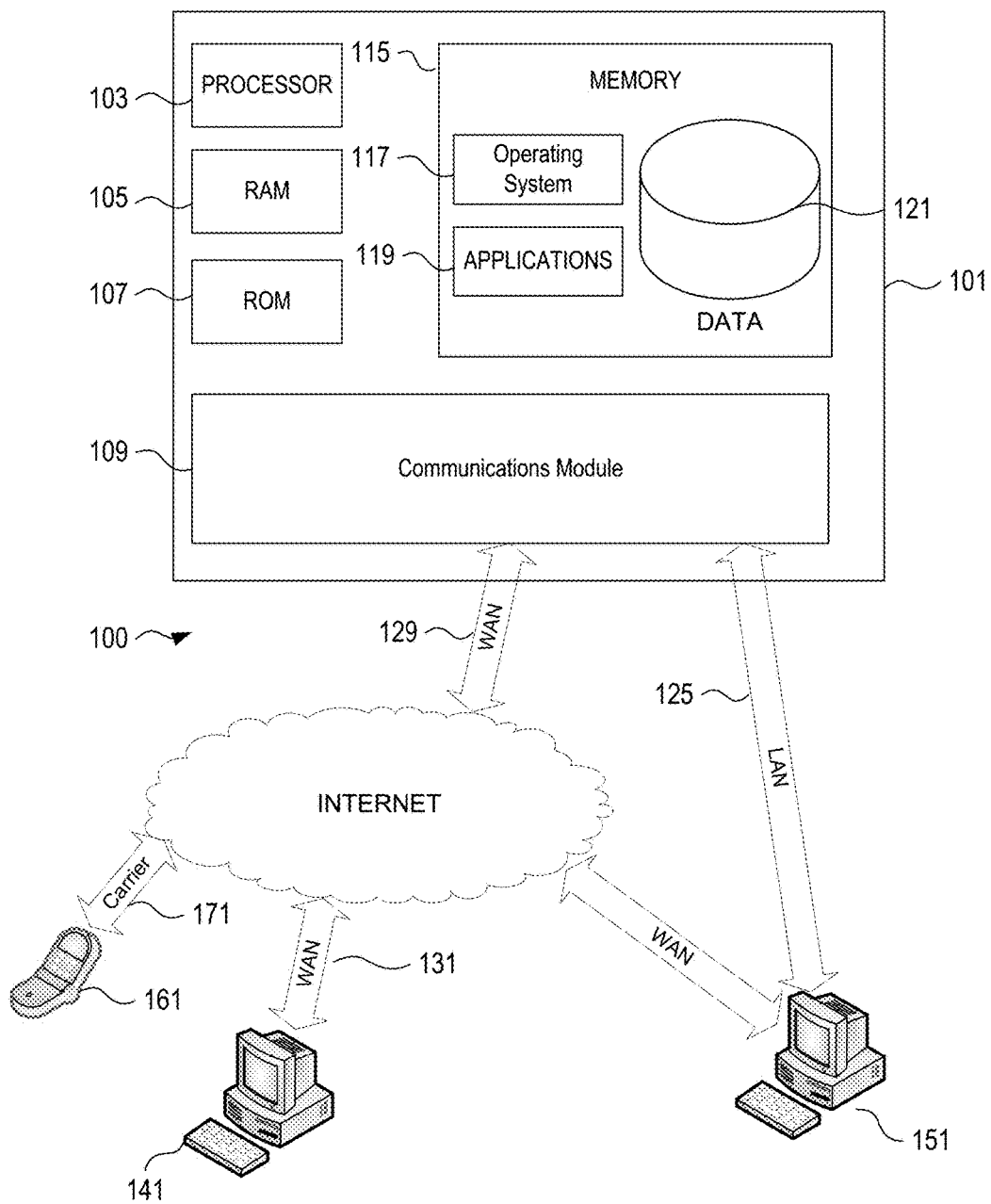
FIG. 1 shows an illustrative operating environment in which various aspects of the invention may be implemented.

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made.

A business process management system may allow a business organization to better manage the organization's workflow in a more effective and/or efficient manner. A business may define a business process as an activity, or set of activities, that are performed to meet a specified goal. An effective business process management system may be implemented in such a way that human errors are minimized and activities performed by associated business personnel are managed effectively. Further, business process management systems may also be used to maintain and/or optimize the business organization's operations and infrastructure. In many cases, the business process management system may be used to integrate interactions between different business units and an information technology (IT) department of the business organization. To facilitate the use of business process management systems, one or more specialized computing languages may be used, such as Business Process Execution Language (BPEL) and Business Process Management Notion (BPML). The business language instructions written using these languages may be used by programmers to translate the business process instructions into computer code (e.g., Java language code, C code, COBOL code, and the like) for deployment on one or more business process servers.

Business process management system concepts have been translated into one or more product packages provided by different vendors. In many cases, the business process management products may not be compatible and/or may include proprietary software, notations, server configurations and/or the like. In some cases, the business process management products may use different architectures, such as a horizontal structure, a vertical structure, and/or a full service suite structure. An illustrative horizontal structured business process management product may be configured to provide with designing and/or developing business processes using a technological focus that emphasizes reusability. Vertically structured business process management processes may utilize a set of coordinated tasks and/or prebuilt templates that may facilitate easy configuration and speedy deployment. Full service business process management suites may allow for process development, process modeling and/or may include simulation and/or testing capability. In some cases, the business process management suites may be capable of interfacing with a business rules products and/or may be processed using a workflow engine. In many cases, the business process management products have been increasingly used by business organizations with business functions distributed between different business units. As such, software as a service (SaaS) business process management products have been used more often. Because a wide variety of business process management products may be available in the market, a need has been recognized for a business process framework (BPF) that may be used as a framework solution developed for business application teams to provide business process driven solution implementations in a consistent and vendor agnostic way across multiple platforms.

As discussed above, business process management (BPM) may be as a method, and the techniques and tools used by business organizations to capture, analyze and/or improve their work practices across the enterprise. While, a business process management system (BPMS) may correspond to an overall system that enables a business organization to utilize BPM. In some cases, when developing a BPM, a modeler may be used. The modeler may be implemented using dedicated hardware, or may be a software tool installed on a computing device, such as a server. The modeler may be shared between different business units across the business organization. The modeler may be a tool that allows business users (e.g., an analyst, a system architect, and the like) to graphically or textually model a business process. The output of the modeler may be a process definition. Once developed by the modeler, an execution engine may executes a defined business processes using the modeler.

In some cases, a business process modeling system may include one or more subsystems to model, execute, monitor, and analyze business processes used by the business organization. The business subsystems may include one or more servers, workstations and/or other computing devices configured run applications included as a portion of the business process framework. For example, a business activity monitoring subsystem may be used to provide real-time, or near real-time metrics corresponding to performance metrics, usability metrics and any problems or other features of the business process instances executed by the execution engine during runtime. A business intelligence subsystem may leverage the runtime process metrics determined by the business activity monitoring subsystem and may enable the business organization, or business unit of the business organization, to determine patterns, trends and/or gaps in one or more defined business processes. The information gathered and/or generated by the business intelligence subsystem may allow business to understand a particular business process, to identify inefficiencies and/or to allow for continual improvement of the business processes, as needed. In many cases, human interaction may also be incorporated into a business process management system. For example, human tasks (e.g., manual tasks) may be defined as a portion of, or in addition to, a process model definition, and may be performed by a business employee, contractor or other human actor associated with the business organization. In some cases, the human actors may utilize one or more user interface screens presented via a display device and include instructions and/or may require input from the human actor as to a result of the tasks performed as part of the business process. Additionally, the display devices may be configured to output the metrics of the process execution, an indication of which portion of the process execution is currently active (e.g., a process execution status) and/or the like.

In some cases, system tasks (e.g., automated tasks) may be defined as part of a process model definition and may correspond to a user of an existing software system, internal or external to the business organization.

In some cases, a service oriented architecture may be used. This service oriented architecture may refer to a level of maturity of an organization to expose business functions in a standard platform agnostic interface at an optimal granularity for efficient reusability. Further, because business organizations may run many business process models concurrently, serially, or as a combination of serial and parallel processes, an enterprise application integration system may be used. The enterprise application integration system may allow business organizations to orchestrate multiple heterogeneous systems within and across organizations, and may be provided by one or more different vendors. In some cases, when defining business models, graphical representation may be used to represent different portions of the processes, such as by using business process modeling notion. Business process modeling notation is an evolving standard for defining a graphical representation of notations used when modeling business practices. Again, different vendor products may be used when defining process model definitions. As such, one or more different software products may be used when developing a model of a business process. In some cases, different standards and/or modeling languages may be used which may be incompatible.

FIG. 1 illustrates a block diagram of a generic computing device 101 (e.g., a computer server) that may be used according to an illustrative embodiment of the disclosure. The computer server 101 may have a processor 103 for controlling overall operation of the server and its associated components, including RAM 105, ROM 107, input/output (I/O) module 109, and a memory 115.

The I/O module 109 may include a microphone, keypad, touch screen, and/or stylus through which a user of the computing device 101 may provide input, and may also include one or more of a speaker for providing audio output and a video display device (e.g., a user interface) for providing textual, audiovisual and/or graphical output. Software may be stored within the memory 115 and/or other storage to provide instructions to the processor 103 for enabling the server 101 to perform various functions. For example, the memory 115 may store software used by the server 101, such as an operating system 117, one or more application programs 119, and an associated database 121. Alternatively, some or all of the computer executable instructions utilized by the computing device 101 may be embodied in hardware or firmware (not shown). As described in detail below, the database 121 may provide centralized storage of account information and account holder information for the entire business, allowing interoperability between different elements of the business residing at different physical locations.

The server 101 may operate in a networked environment supporting connections to one or more remote computers, such as the terminals 141 and 151. The terminals 141 and 151 may be personal computers or servers that include many or all of the elements described above relative to the server 101. The network connections depicted in FIG. 1 may include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing wired and/or wireless communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the server 101 according to an illustrative embodiment of the disclosure may include computer executable instructions for invoking user functionality related to communication, such as email, short message service (SMS), and voice input and speech recognition applications.

The computing device 101 and/or the terminals 141 or 151 may also be mobile terminals (e.g., a cell phone, a tablet computer, a laptop computer, a smart phone, and the like) that may include various other components, such as a battery, speaker, and/or antennas (not shown).

The disclosure is operational with numerous other general purpose or special purpose computing system environments or configurations. Examples of computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules may include routines, programs, objects, components, data structures, and the like for performing particular tasks or implementing particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
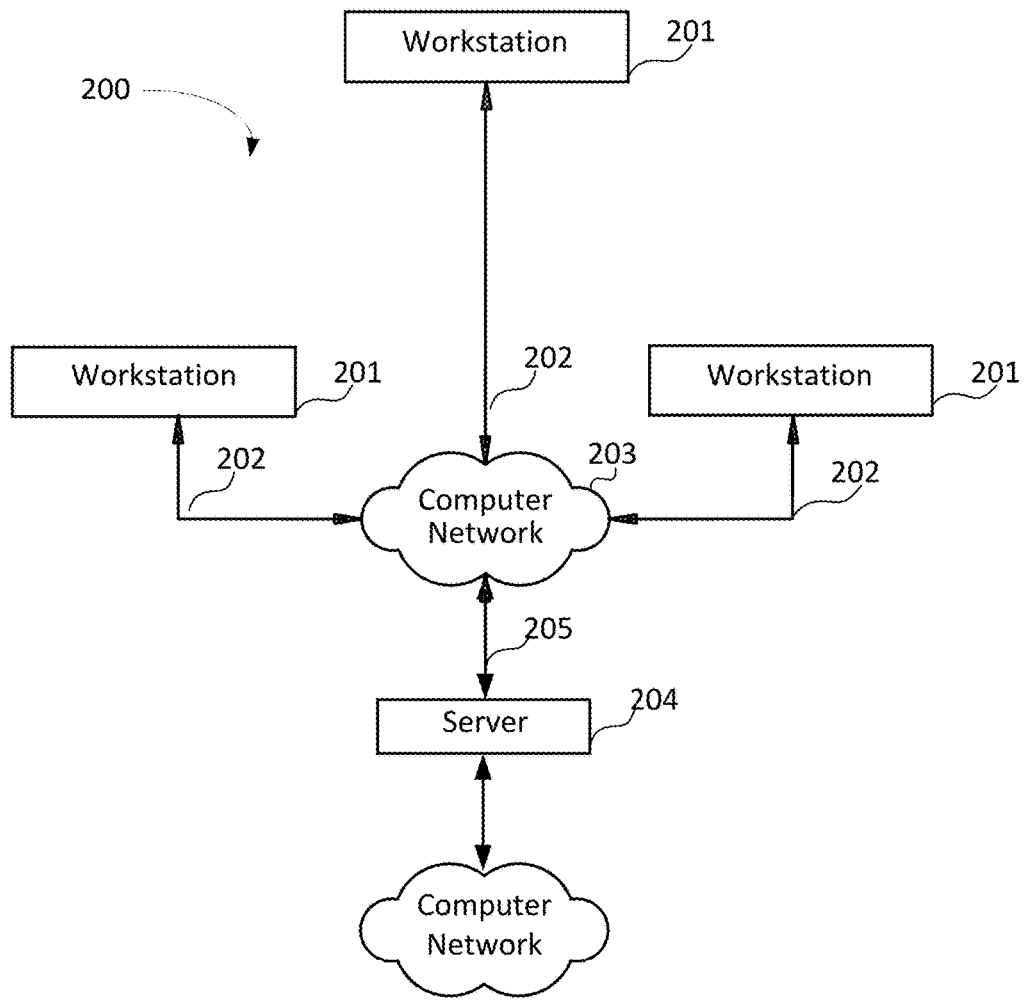
FIG. 2 is an illustrative block diagram of workstations and servers that may be used to implement the processes and functions of certain aspects of one or more aspects of the present disclosure.

Referring to FIG. 2, an illustrative system 200 for implementing methods according to the present invention is shown. The system 200 may be a risk management system in accordance with aspects of this invention. As illustrated, system 200 may include one or more workstations 201. Workstations 201 may be local or remote, and are connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, and hard-wired links. Connectivity may also be supported to a CCTV or image/iris capturing device.

The steps that follow in the figures may be implemented by one or more of the components in FIGS. 1 and 2 and/or other components, including other computing devices.

A business process management (BPM) system may be used to allow organizations to better manage their business processes. In some cases, BPM systems may include a modeling tool that enables users (e.g., a business team, a technology team, and the like) to define process models. The BPM systems may also include an execution engine that executes the defined process models. Further, the BPM system may allow runtime metrics to be collected for running process instances and to be presented for near real-time troubleshooting of performance and other related issues via tools such as a business activity monitoring (BAM) tool. Moreover, information collected from a business activity modeling tool may be collected to be used for one or more strategic business analysis activities, such as for long term trending on usability and/or performance aspects of the defined business processes. Such information may be consumed by different applications associated with business units (e.g., business intelligence tools) that may enable a business unit to continuously improve on process inefficiencies, if any exists and can be identified.

A business process management system may allow a business to better align the actions of different business units to a common goal. Further, the business process management system may allow for better alignment of business activities among business unites of a business organization and/or may allow for better "business agility" in allowing business processes to better adapt to changing business conditions. In some cases, the business process management system may allow for better documentation of business process models to facilitate easier control over the documented processes. Further, by measuring metrics associated with the different modeled processes, the BPM may allow for process optimization and/or convergence towards a common goal.

When using a business process management system, one or more design principles and/or assumptions may be utilized. For example, when designed properly, a model of a business process is what is executed to apply that process. In some cases, the model may only be executed by the execution engine of the BPM to control the execution of the business process. Further, when designing models, exceptions, compensation and/or other events, cancellation triggers, suspension triggers, termination triggers associated with the process should be defined during the process modeling process and not executed through an application programming interface (API). In other words, not only should the process itself be modeled, but also the exceptions to normal operation. When applicable, a single process modeler may be used and associated with a single execution engine, where the execution engines are used to manage the business process flow. In many cases, models developed using a BPM may only support asynchronous executions with an acknowledgement token as a response. In many cases, the BPM may not differentiate between a human resource (e.g., a human actor) and a system resource (e.g., a server executing an application). A business process management system may support many common process execution flows, such as a merge and a split. In many cases, the BPM system may include an integrated exception handling and/or compensation system for handling one or more exceptions that may be encountered during process execution. During a process execution, the execution engine may utilize both long running and short running activities. Also, if an activity or other portion of a process is not initiated, the execution engine may allow for a specified number of retries (e.g., 10 retries, about 20 retries, and the like). Also the execution engine may be configured to identify and process duplicates, which may be accomplished through a key/indicator provided by a business user.

In many cases, the BPM may support activities commonly encountered during execution of a business processes, such as by supporting service level agreements (SLAs) and/or supporting escalations. For example, during a process execution, a priority associated with the business process may be escalated when a criterion (e.g., an application of a business rule, a threshold condition, and the like) has been met. As discussed above, the modeling of business processes evolves over time. As such the BPM may support versioning of process models, which may allow for an improvement in business agility. For example, by allowing for versioning of a business process, changes may be tracked to identify changes between different updates to the business process model. The BPM may also support an activity log that may be used, for example, for auditing of all in-process activities and/or for identifying and tracking processes failures, such as a process failure of over a specified duration.

In many cases, the BPM may support one or more standard process modeling notations (e.g., BPMN, BPEL, BPML, and/or the like) and/or one or more different standard process definitions, such as the XML process definition language (XPDL). Further, the BPM may support context flow through one or more business activities, such as by monitoring an input to a business activity and monitoring a resulting output from the business activity resulting from the inputs. In many cases, the business process may include one or more user interfaces for business users to access at least a portion of the process. These user interfaces may be generated on-the-fly to synchronize changes as the business process model is designed and/or modified by the modeler tool. The BPM may further include a resource engine that may be configured to manage one or more work items for different organizational resources. For example, the resource engine may be configured to manage system resources and/or human resources based on a status of one or more work items. Further, the resource engine may further allow for queries to determine a status associated with any particular resource, such as through a user interface screen. The BPM may further include an artifacts engine that may be used to manage transfer of large payloads (e.g., data packages), such as documents, executables, and/or the like. The artifacts engine may also be configured to provide a secure mechanism (e.g. using a secured key based mechanism) for storing and/or retrieving documents, or other large payloads, processed in the BPM system.

The execution engine may be monitored to ensure specified performance expectations. Further, the execution engine may be configured to allow for expansion of a process as it evolves (e.g. "scale up and out"). In some cases, the execution engine may handle large amounts of process executions over a specified time period. For example, an execution engine may handle over a million process executions over a specified duration (e.g., about 12 hours, about 18 hours, about 24 hours, and the like). Further, because a business process has been modeled to perform in a certain sequence, to maintain integrity of the business process, the execution engine may limit workarounds available to client applications. However, in some cases, workarounds may be allowable (e.g., exception handling or for compensation of unexpected process inputs. The execution engine may be responsible for execution of all aspects of the business process models, rather than allowing an external application, such as the business process framework, to execute a portion of the process. For example, the execution engine may allow process status queries to determine a status of the process, rather than allowing external applications to synchronize information in a separate database. As a result, each business process executed within the BPM may be audited at runtime. When secure processes are performed, security and/or provisioning systems may be integrated into the process execution by the execution engine. In many cases, business rules processed by a business rule management system associated with the business organization may be integrated into the business process management system and utilized by one or more business process models. By doing so, the BPM provides capability to externalize complex business rules and invoke rules, as needed, to make runtime process flow decisions.

Figure 3:
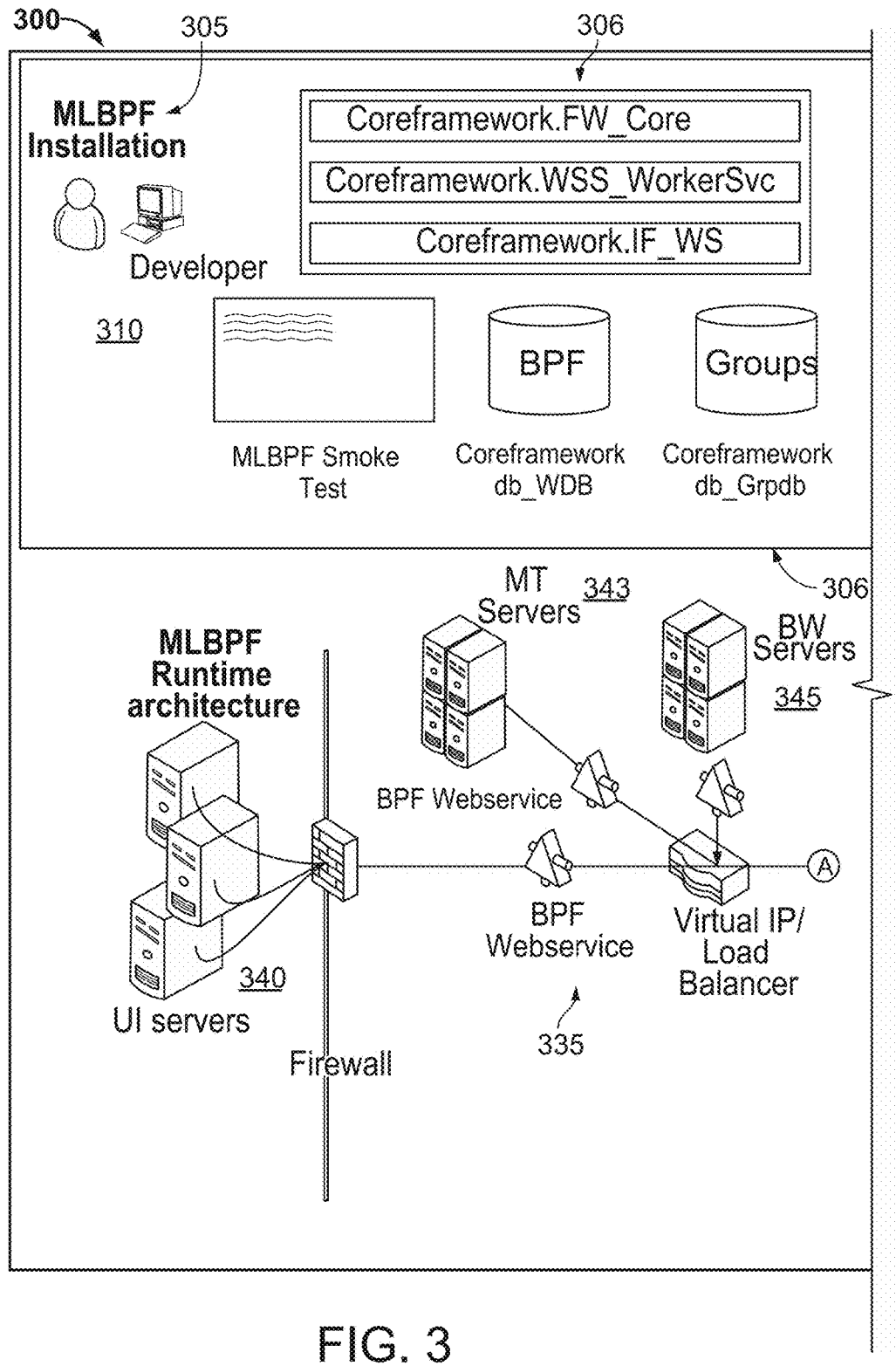
FIG. 3 shows an illustrative block diagram of a system providing a business process framework according to one or more aspects of the present disclosure.
Figure 3:
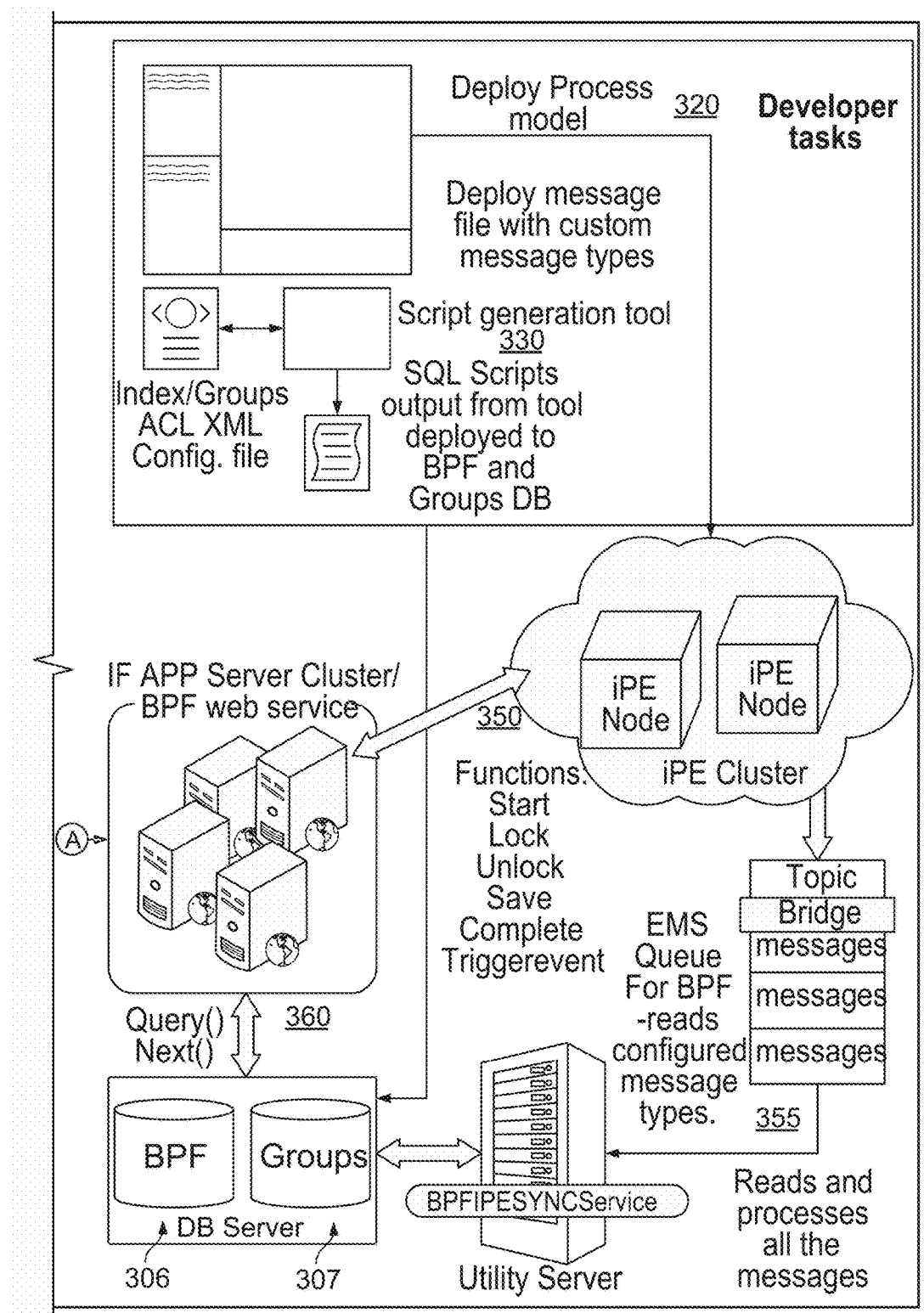

FIG. 3 shows an illustrative block diagram of a system 300 providing a business process framework 305 according to one or more aspects of the present disclosure. In the illustrated example of FIG. 3, a business rule framework 305 may be installed on a hardware platform, where the business process framework components that may be installed may include multiple application server products (e.g., a core framework product, a framework services product and an IF framework product) and one or more data repositories that may include a process framework database and a group management database, where the databases 306 may correspond to process framework instances that may be deployed with each business unit of the business organization when implementing their specific processes. In some cases, one or more process developers and/or system architects may access and/or install the applications and/or data repositories at 310. The developers may then perform a test, such as a smoke test, to ensure that the business process framework is operating as expected.

At 320, a business process may be modeled and/or deployed, where files corresponding to the underlying business process management system may be deployed and for defining one or more message types. At 330, one or more schemas (e.g., an XML schema) may be used to configure the business process framework database instance 306 and/or the group database instance, 307. For example, the one or more XML schemas (e.g., 3 schemas) may be used to prime the BPF database 306 and/or the Group database 307. A scripting tool may be used to convert the XML code to database specific code (e.g., SQL). The business process framework may include one or more web services 335 that may be called from one or more servers, such as the user interface servers 340, the MT servers 343 and/or the BW servers 345. At 350, the business process framework may make one or more single sign-on (SSO) calls to an in place element (iPE) node within an (iPE) cluster, for APIs not including a query API or a Next API. At 355, a business rule framework synchronize service may listen to an enterprise message service (EMS) queue created for the business process framework. The messages in the queue may be based on an earlier deployed MER file. At 360 query and/or next APIs may return the work items from the business process framework database 306 based on the groups and access levels defined earlier.

Figure 4:
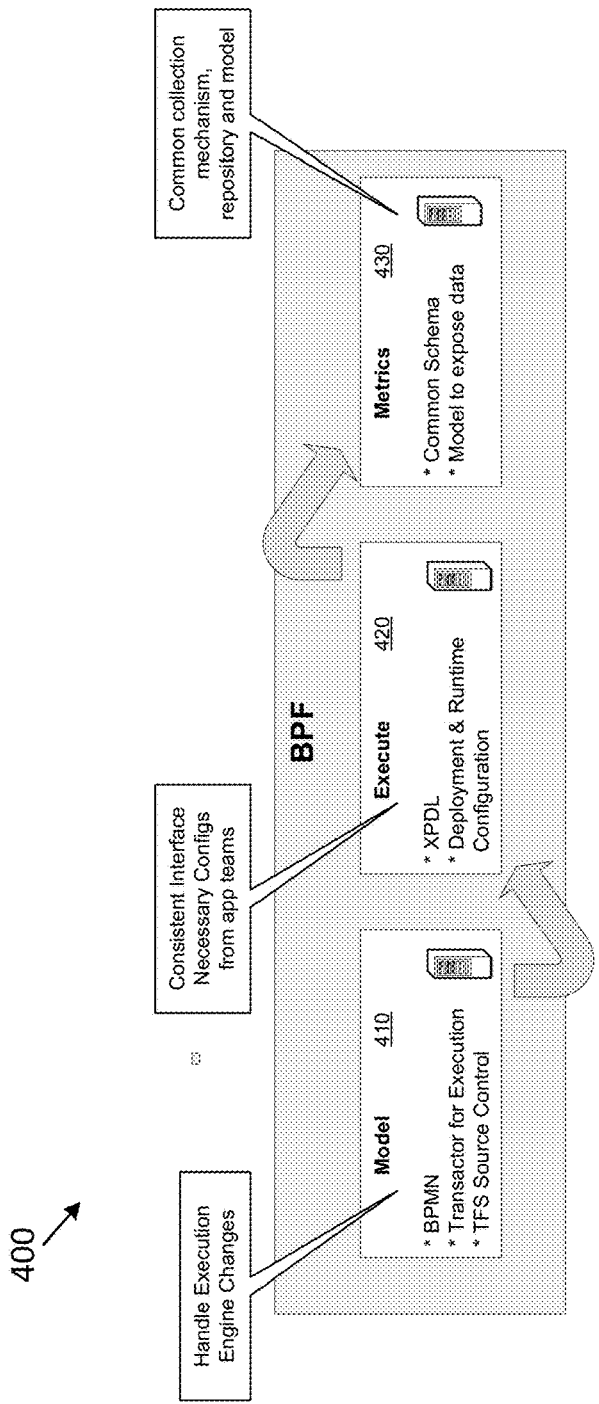
FIG. 4 shows an illustrative method for managing a business rules framework according to one or more aspects of the present disclosure.

FIG. 4 shows an illustrative method 400 for managing a business rules framework according to one or more aspects of the present disclosure. For example, at 410, the business process framework may interface with a modeler that may be included as part of the underlying business process management system to model at least a portion of a business process. In some cases, the modeling process at 410 may be configured to handle any changes to an underlying execution engine. For example, the execution engine may change from a product offered by a first vendor to a product offered by a second vendor. In the change, the user (e.g., model developer, the business employee, and the like) may not notice a difference in operation between the first execution engine and the replacement second execution engine. The business process framework may then execute at least a portion of the modeled process at 410. Here, the business owner using an instance of the business process provided by the business process framework may be access the business process during execution via a consistent interface that remains the same regardless of the underlying BPM product. The configuration of the user interfaces may be provided by application teams that may work together with the business units to design the user interface to math requirements provided by the business unit. The business process framework may then be used to gather metrics corresponding to the operation of the business process being executed at 430. These metrics may be gathered using a common schema and may utilize a common collection mechanism, repository and/or collection model. In some cases, an illustrative business process framework may be configured to enable business process model agility. For example, this agility may correspond to a quicker deployment of process model changes that may result from a lightweight validation process. The business process framework may be designed to abstract vendor specific products during various run-time implementations. In some cases, the level of abstraction provided by the business process framework may correspond to an abstraction between a consumer and a BPM product choice, so that product changes can be completed, such as by an IT department, without disrupting a consumer, such as a business unit. In some cases, one or more standards may be used to enable communication between BPM components. In some cases the business process framework may be configured to allow for standard output of process models to be processed by a specified process execution engine, such as an XPDL engine. If, a different type of execution engine is used, then the business process model may include a translator to facilitate conversion of a process model from one target to another. Further, the business process framework may include a consistent runtime interface for the BPM products, so that regardless of the BPM product chosen for implementation, the business user may utilize a same look and feel of the user interface so that business users may use different design and/or deployment product tools.

In some cases, implementing a business process framework may involve product changes including design tool changes and/or deployment tool changes, which may result in additional training time to be dedicated so that users may learn new tools. Further, existing process definitions may need to be migrated. However, the overall business process system may be simplified. In an example, one or more "application recipes" may be available, such as to serve as a guide for runtime. A time to deployment and operation may be reduced. In some cases, separate interfaces may be developed to support different BPM products, while a common interface may be supported at the user level. In some cases, the different interfaces may correspond to process flow executions, process administration, and work items associated with one or more processes, process instances and/or documents (e.g., artifacts). In some cases, components may be purchased and/or reused as opposed to building new, custom applications (e.g., a modeler user interface, business activity monitoring tools, and the like). However, new applications may be built to fill gaps and/or to avoid undesirable features of existing products.

In some cases, a vendor supplied BPM product may be chosen as the execution engine to orchestrate and/or execute one or more defined business processes. The existing engines may have some known limitations such as, for example, handling concurrent queries to work items and process instances at runtime. To overcome this limitation, the business process framework may be designed to control the flow of requests going to the actual BPM execution engine at runtime. Another limitation known about one or more vendor supplied BPM products may include a known limitation in performance when more process related data is stored in the execution engine as part of the process instance. Additionally, one or more execution engines may not support different communication protocols, such as XML. To overcome these limitations and at the same time allow application teams to provide process related data as part of the process execution, the business process framework interface is designed to allow clients to provide an XML document for execution and/or configuration purposes. Although, the runtime interface may allow clients to provide XML configuration files, the process model may still be dictated by the limitations of what the engine can execute.

Because different execution engines may not handle system calls, the execution engine may outsource those calls, such as to a different business process product for execution. An external execution engine may expect an external system to return an identifier that the execution engine provides while making the call by altering the external system input and output parameters. This may be very inefficient as all existing service orientated architecture (SOA) systems may need to be altered to accommodate BPM support, as no other product may provide a practical way to make an XML SOAP based system calls from the execution engine.

One or more use cases may be associated with a business process management system and/or a business process framework and may be associated with one or more associated roles. For example, a process initiator may start a process and/or retrieve a process. The process initiator may be a business process management role category defined in a BPM system for a specified business organization and may be allowed to start a process and/or get a stored process. A process administrator may be granted authorization to get process instances from a storage location (e.g., the central repository), get a process, get a process instance, and/or terminate process instances. A workflow worker may be granted access to complete a work item, lock a work item, unlock a work item, update a work item, view a work item, cancel a work item and/or get a workbench list, while the workflow administrator may be granted permissions to unlock a work item, view a work item, cancel a work item, get a work item list and/or assign/reassign a work item. A process administrator may get process instances, get processes, get process instances and/or terminate process instances. An event signaler may be allowed to trigger events and a service task completer may be granted permissions to complete and/or otherwise work on a service task. Further, a business process servicer may be granted permissions to make external service calls.

Users that may be associated with this role may have the ability to perform the following uses cases on the specific processes of which they have been granted access. For example, when defining a business unit in the BPM system, a business process management role necessary for the unit may be created with a respective work list or work queue mapping and/or authorization role mappings. To start a process, the authorized user may start a long or short running process instance or a case instance that may already be modeled and/or registered with a selected business process management system.

A process administrator may be defined at a business user level such as to administer all running instances of any defined process. A "get process" use case may provide a list of defined processes at the business unit level and may be associated with the business unit. The get process instances instance application may provide a list of currently running and/or closed instances of a given process. A get process instance user case may provide details of a list of currently running and/or closed instances of a given profession, and the terminate process instance may be used to identify and/or terminate a running process instance use case may allow a user, such as a process use.

Workers associated with the business process framework may include actors defined in any process model. In some cases, the actors may be mapped to work lists or queues, as define in the BPMS. During runtime workers may be able to perform the following user cases. For example, the item worker may be able to lock work items, which may allow a worker to gain exclusive access to a work item that he and/or she are entitled, update work item, and/or mark a work item as complete.

Workers are basically the actors defined in any process model. Actors are mapped to work lists or queues defined in the BPMS. During runtime, workers can perform the following use cases related to work items that they are entitled to, to lock the work item to allow a worker to gain exclusive access to a work item that he complete work item which may be configured to complete a work item. a worker may be configured to access the update work item use case and/or the complete work item use case.

A Work Item Administrator may be a role defined to assign and/or reassign a work item. This user role may allow a work item administrator to assign a specific role and/or reassign exclusive access to a work item that he/she be entitled to a role defined and specific individuals are assigned to this role to administer work items under a given organizational unit. Users under this role can perform the following use cases related to work items, such as to assign and/or reassign a work item and/or to assign a specific work item to a specific role or exclusive access to a work item that he/she will not be used to.

A work item worker user may be configured to apply one or more use cases pertaining to work item administration and/or also work item administration and work access for workers. The following use cases pertain to Work Item Administrator and also to Workers related to the items they are entitled to work on, such as to allow a user to unlock a work item, to access a worker or administrator, view a work item to allow a worker or administrator to view details of a specific work item, to cancel a work item and/or to get a work item list, which may allow a worker or administrator to view a list of work items available in a work list or across work lists. For example, in the case of a worker, the list may be restricted to the list of items he/she is entitled to view.

Other general use cases that a worker may perform may include: triggering an event, allowing an application to trigger a named event that the BPMS may be waiting on, to make an external system call and/or to notify completion of an external service call.

Figure 5:
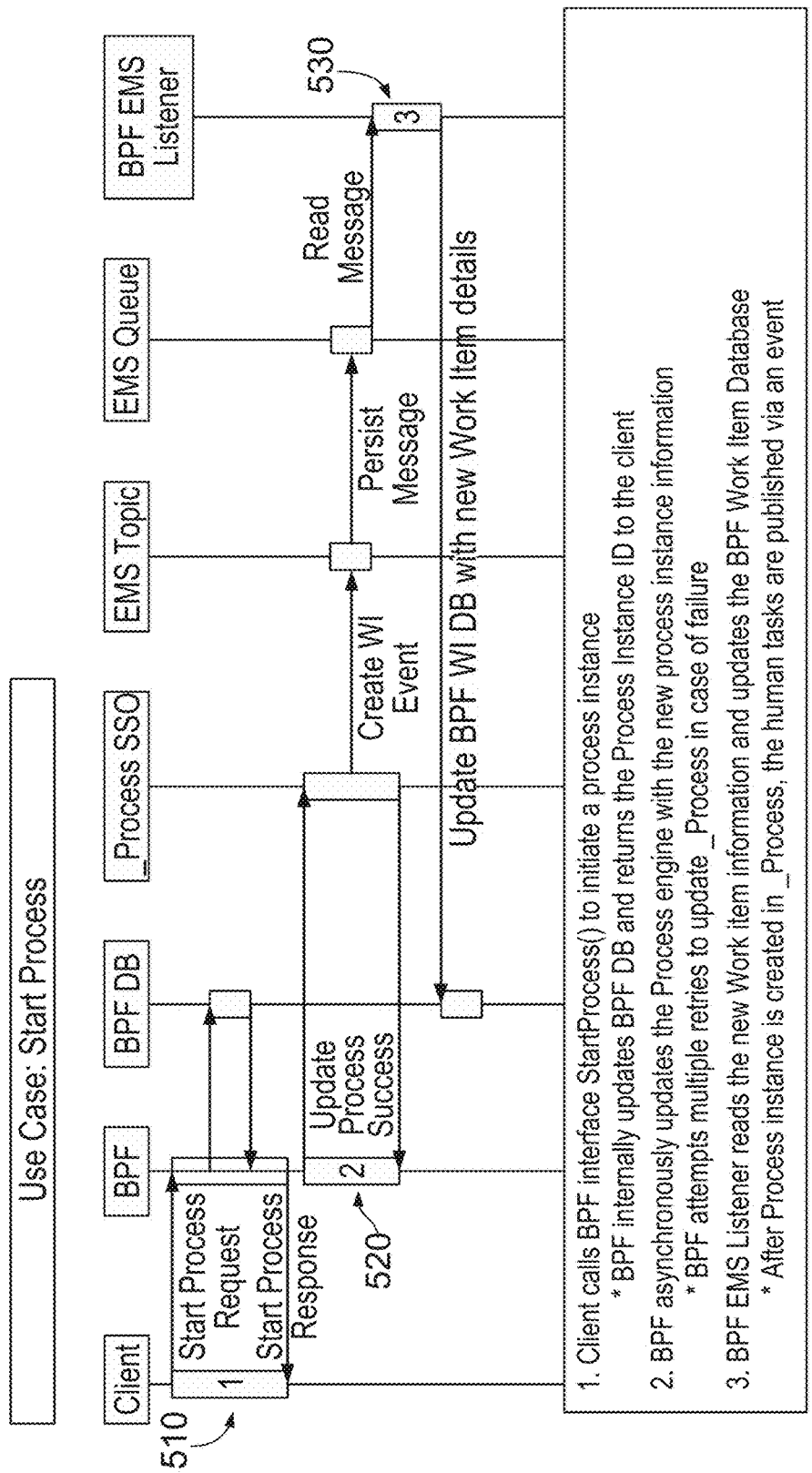
FIG. 5 shows an illustrative use case of the business process framework according to aspects of the present disclosure.

FIG. 5 shows an illustrative use case of the business process framework according to aspects of the present disclosure. For example, at 510, a client may initiate contact with the business process framework (BPF) by calling a function (e.g., start process ( )) to initiate a process instance. The BPF may internally update a BPF DB and return the process instance ID to the client. At 520, the BPF may asynchronously update the execution engine of the underlying BPM with the new process instance information. The BPF may attempt multiple retries to update the execution engine in case of a failure. At 530, a business process framework may include one or more monitoring tools, such as a BPF listener. This BPF listener may read new work item information and update the BPF work item database. After a process instance is created in the execution engine, one or more human tasks may be presented and/or published such as by using an event.

Figure 6:
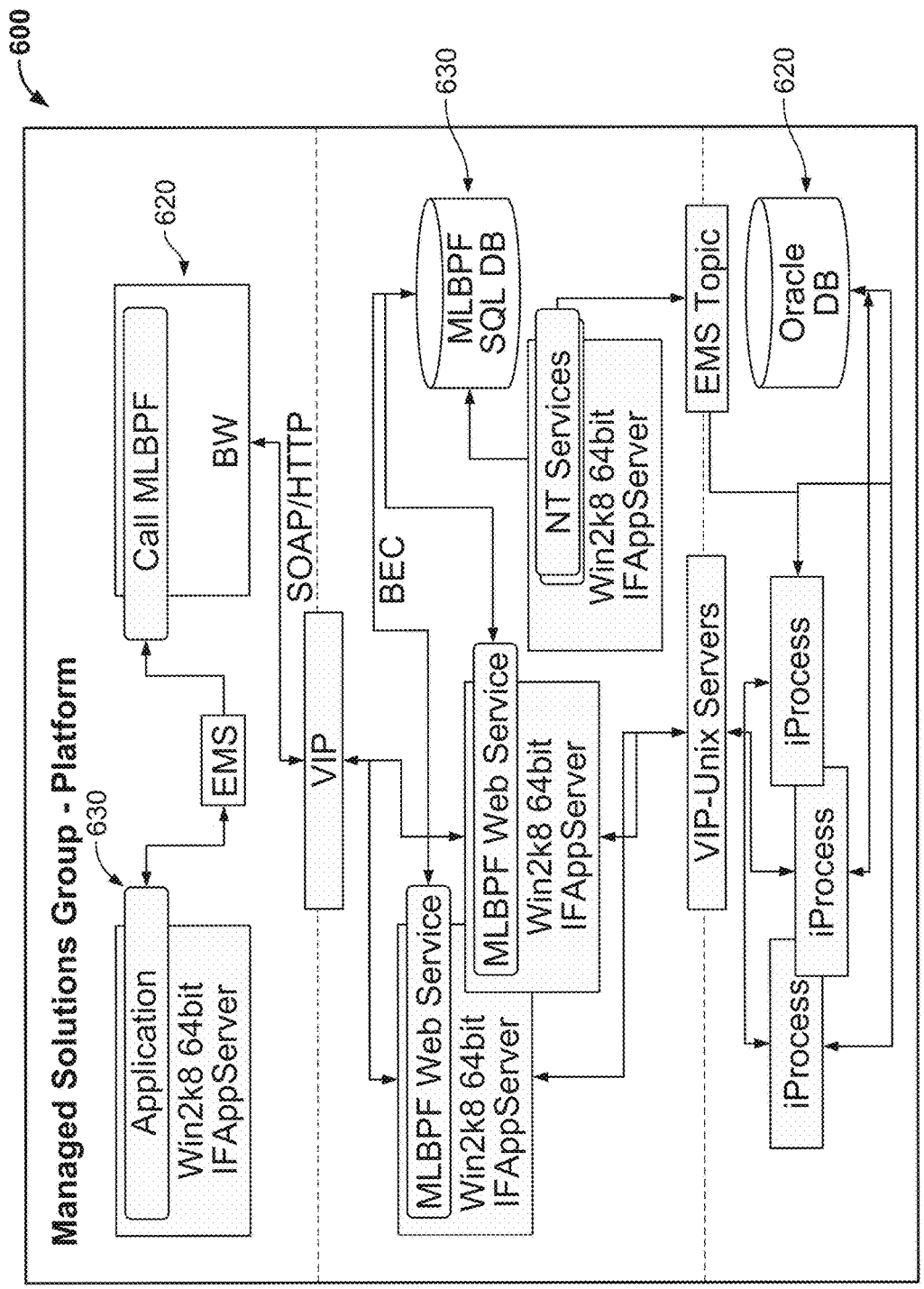
FIG. 6 shows a block diagram representation of a deployed business process framework system according to one or more aspects of the present disclosure.

FIG. 6 shows a block diagram representation of a deployed business process framework system 600 according to one or more aspects of the present disclosure. The illustrative block diagram represents the logical architecture of a business framework solution, with an approach to provide a platform specific implementation of the framework. This approach may allow maximum flexibility and/or control for the corresponding business organization unit that is supported by the platform. In the below diagram, a message single experience platform is taken as an example and the business process framework core components are depicted along with the underlying BPM platform that supports this platform. A similar implementation approach may be used to support each business organization unit as they migrate to the BPM platform leveraging this business process framework. Please note that the boxes labeled 620 represent the underlying business process management infrastructure. The boxes labeled 630 represent the ML BPF infrastructure. A business platform specific deployment seems to fit most of the functional and non-functional requirements both in terms of flexibility for business organization unit and also from a practical underlying BPM Services layer implementation that supports the business units. Below diagram depicts the BPF component deployment on each platform supporting the respective business units.

Figure 7:
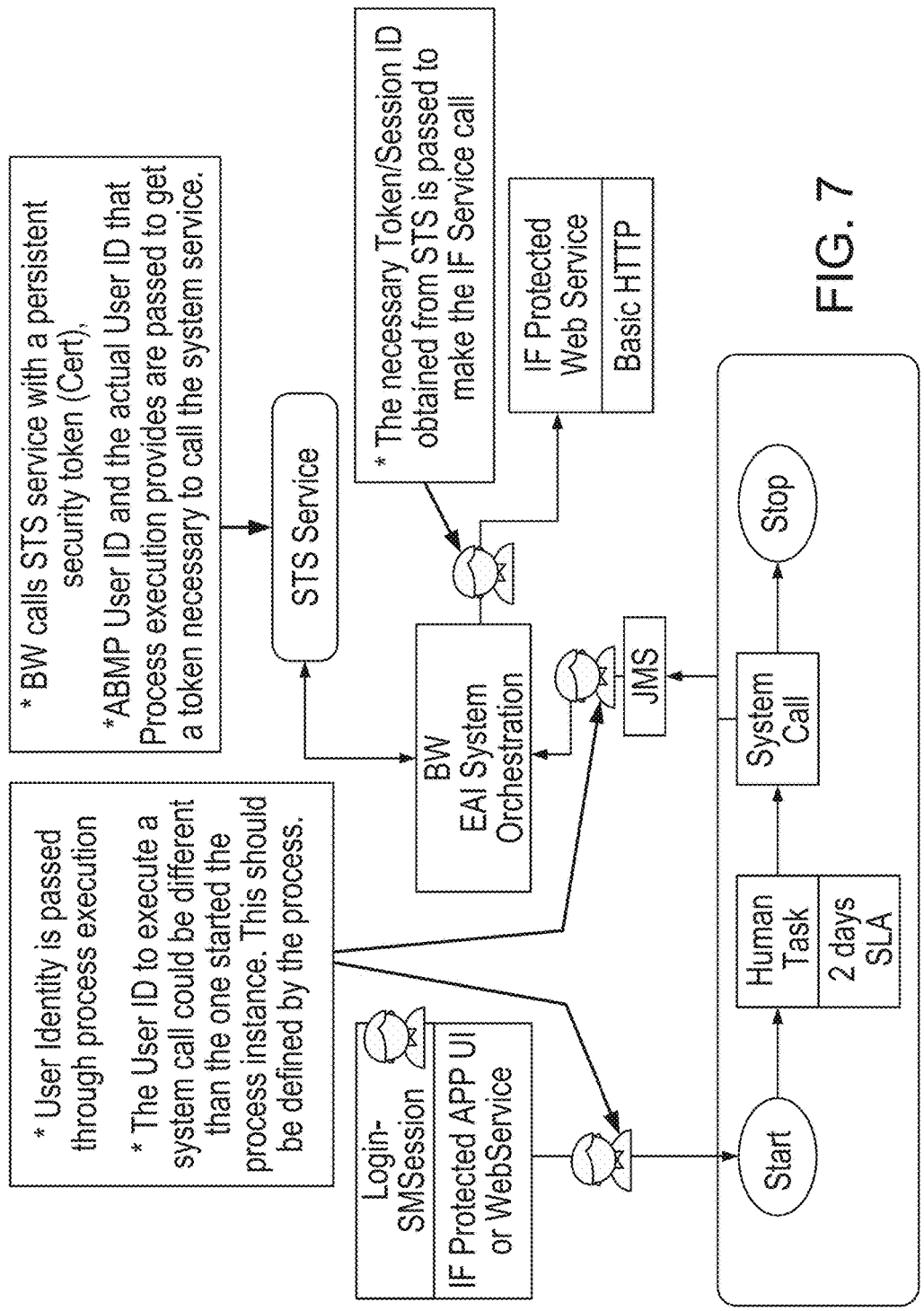
FIG. 7 shows an illustrative security implementation according to one or more aspects of the present disclosure.

FIG. 7 shows an illustrative security implementation according to one or more aspects of the present disclosure. A platform specific deployment may include specific advantage and/or disadvantages. For example, the advantages may include that the platform may stay consistent with the underlying BPM platform supplied by a vendor and that has specific process instances for each business organization's critical Business Process Application. This internal structure may avoid the necessity for BPF to maintain a mapping of application to process instance. Further, this structure may assist in avoiding cross platform dependency for changes applicable to a specific business organization. Further, the platform specific deployment may allow maximum flexibility for each business organization unit in terms of SLAs, data retention, storage capacity planning and independent schema manipulations and may eliminate a need for release coordination between business specific platform timeline and the business unit's release timeline. Also, the platform specific deployment may allow an application process schema to be independent to other organizations or applications schema definition, which may further allow for independent changes as needed. Possible disadvantages to the platform specific deployment may include that the platform may appear to deviate from the horizontal solution and centralization of server types in one common platform that supports multiple business units. Further, database schema changes by the application teams may lead to issues and possible ownership issues of such changes.

To avoid the possible disadvantages, the BPF may be designed to be generic enough for different business organization units to deploy and configure for their respective needs. All necessary configurations are exposed as external variables that can be driven by platform specific values. Further, apart from the physical storage needs, the rest of the BPF components can co-exist on existing server types on the respective business specific platforms. Also, necessary tools may be built to avoid the direct updates to the database schema by the application teams. Guidance and support may be included as an important part of the BPM on-boarding process defined by the BPM services team. Note on possible disadvantages in deploying on a common platform that horizontally supports multiple business units:

1. Changes to the database schema from one business unit in terms of process and related work item attributes definition could potentially impact or interfere with other business unit's process definition.
2. Business platform specific release timelines may not match the platform that horizontally supports multiple business units. This increases release coordination effort to match changes sourcing from multiple business platforms based on their respective release timelines.
3. Increases the complexity of SLA management in terms of storage capacity planning and data retention requirements, since each business unit might have different requirements and SLAs to meet.

In some cases, the business process framework may be deployed as a web service that clients can consume via SOAP over HTTP. Applications may drop an EMS message to start a BPM process execution via a business process management product offered from a vendor. in some cases, the BPM product may allow for retries and/or asynchronous calls. Applications may also call the web service synchronously via http request/response. The business process framework may include a web service protected by a security server that may require authorization using one or more different methods, such as an authorization cookie. In many cases, user roles associated with processes may be monitored and/or serviced by the business process framework by checking the business process framework group assignments stored in the database associated with the corresponding org unit and defined for role to process name mapping.

Each organizational unit or application team may define its own instance of the business process framework interfaces to stay consistent with the business process management system platform design based on the selected business process management product suite. This isolation may help in many ways as outlined below:

1. Stays consistent with the underlying BPM platform that has specific vendor defined instances for each business organization's critical Business Process Application;

2. Avoids the necessity for BPF to maintain a mapping of application to individual instances of the vendor supplied applications;

3. Avoids cross platform dependency for changes applicable to a specific business organization;

4. Allows maximum flexibility to each business organization unit in terms of SLAs and data retention and storage capacity planning;

5. Eliminates release coordination between business specific platform timeline a business unit release timeline; and 6. Allows an application process schema to be independent to other organization's or applications schema definition—further allowing independent changes as needed When the Business process framework receives a call from a vendor BPM product after the user authorization, the an instance of the execution engine may be called via a library and/or other executed code. If the call to the execution engine fails, then the call may be recorded in the data repository for frequent retires, which may require a specific service to accomplish. Any work item related activities may be written to the SQL and communicated to execution engine servers for process status changes. In some cases, the business process framework may maintain authorized roles of the business process framework to include roles associated with an administration user interface and/or a batch tool to manage this mapping. This mapping could be one to many or many to one. For example, an administrator could belong to advisory team member's roles for MSG related process flows. When a user may ask for one or more work items, the user identification information may be passed via a user interface application to the business process framework service, along with other session identification information. The business process framework may include web services that are protected based on a user's identification information. The service may then check the role associated with the user before mapping a corresponding business process management role. The business process framework may then map the roles to corresponding business process management rolls. The business application may then decide when, or if, to provide further filtering and/or sorting of criteria when fetching work items for the user.

In some cases, the business process framework may include architecturally significant design packages. For example, the business process framework may include different web applications, such as 1. BPF Web Services a. BPF_ProcessWS—Web Service URL logically grouped for Process related runtime operations. This web service may provide processes related runtime interface b. BPF_WorkItemWS—Web Service URL logically grouped for Work Item related runtime operations. This web service may provide work items related runtime interface 2. BPF Database Schema a. BPF_ProcessWorkItemDB—a data repository instance may have a schema for holding the process and work items related to process instances. This schema may be changed and managed by the application teams based on their process definitions and attributes related to the processes. The business process framework will provide tools to alter the schema so there is no confusion of application teams directly altering the schema.

b. BPF_BPMGroupsDB—a data repository instance may have the application or organization unit specify BPM groups and group membership mappings along with permissions to the work steps in the process definitions. This may allow for the BPF runtime to provide appropriate work items to the users in conjunction with user identity received from Framework Context after Security Framework Authorization.

3. Operating Systems Services to Interact with A BPM Engine a. BPF_ProcessEventsListnerService—This operating system service may run as a single instance to listen on a BPM messaging product for events from a BPM core engine supplied from a vendor. The process owner may submit a file to a BPM Services team that may defines the events to be published by execution engine through an interface. As part of this process, the BPM services team may configure the EMS to bridge certain key event messages to the agreed upon queue for BPF. This operating system service may listen on this queue and picks up any new messages. These messages may be processed based on the type of the event. Some of the functions are:

i. When a work item is processed (created) in the execution engine, then that work item is created in BPF_ProcessWorkItemDB.

ii. When a Sub-case is started in execution engine, then a corresponding Process Instance may be created in BPF_ProcessWorkItemDB.

iii. When a work item is withdrawn in execution engine then a corresponding work item may be deleted in BPF_ProcessWorkItemDB.

b. BPF_ProcessInteractionService—This operating systems service may run as a single instance to attempt and/or re-attempt incomplete transactions with the execution engine that are originated by the process owners and work item users at runtime through the BPF_ProcessWS or the BPF_WorkItemWS web service. These transactions may be stored and maintained in the BPF_ProcessWorkItemDB and appropriately read and handled by this NT service. This helps in handling the execution engine downtime without directly impacting the end clients during run-time.

4. BPF Admin Web Tool (User Interface and Scripting Tools)

An Administrative user interface may interact with BPM-GroupsDB to allow manipulation of groups, user memberships to groups, rules, permissions on work steps, and the like.

5. BPF Metrics Sub-System

This subsystem may leverage the existing user interface and data repository created for the initial phase of this project. Then in the subsequent phases tis subsystem may improve or create a system to meet the requirements accordingly.

6. Tools

In the future different tools may be included as needed.

In some cases, different security features may be incorporated into the business process framework. For example, basic authentication and authorization may be done at the application level using the existing Security Framework patterns. A user identity (UPN) may be passed along to the BPM engine to be stored and/or communicated. In some cases, the UPN may be passed to the BPM engine to be stored and forwarded through the process orchestration. The protected system may call for calls to be made anytime during the lifetime of the process execution, which could be in days or weeks to complete. When a protected system call is to be made, the necessary UPN which could be either the user who initiated the process instance or any other user who is defined in the system is passed on to the security service. The security service may be a persistent security certificate by the BPM system along with a dedicated BPM User ID to ask for a valid token for the user that needs to make the secured system call. This valid token from the security service may be used to make the actual system.

Figure 8:
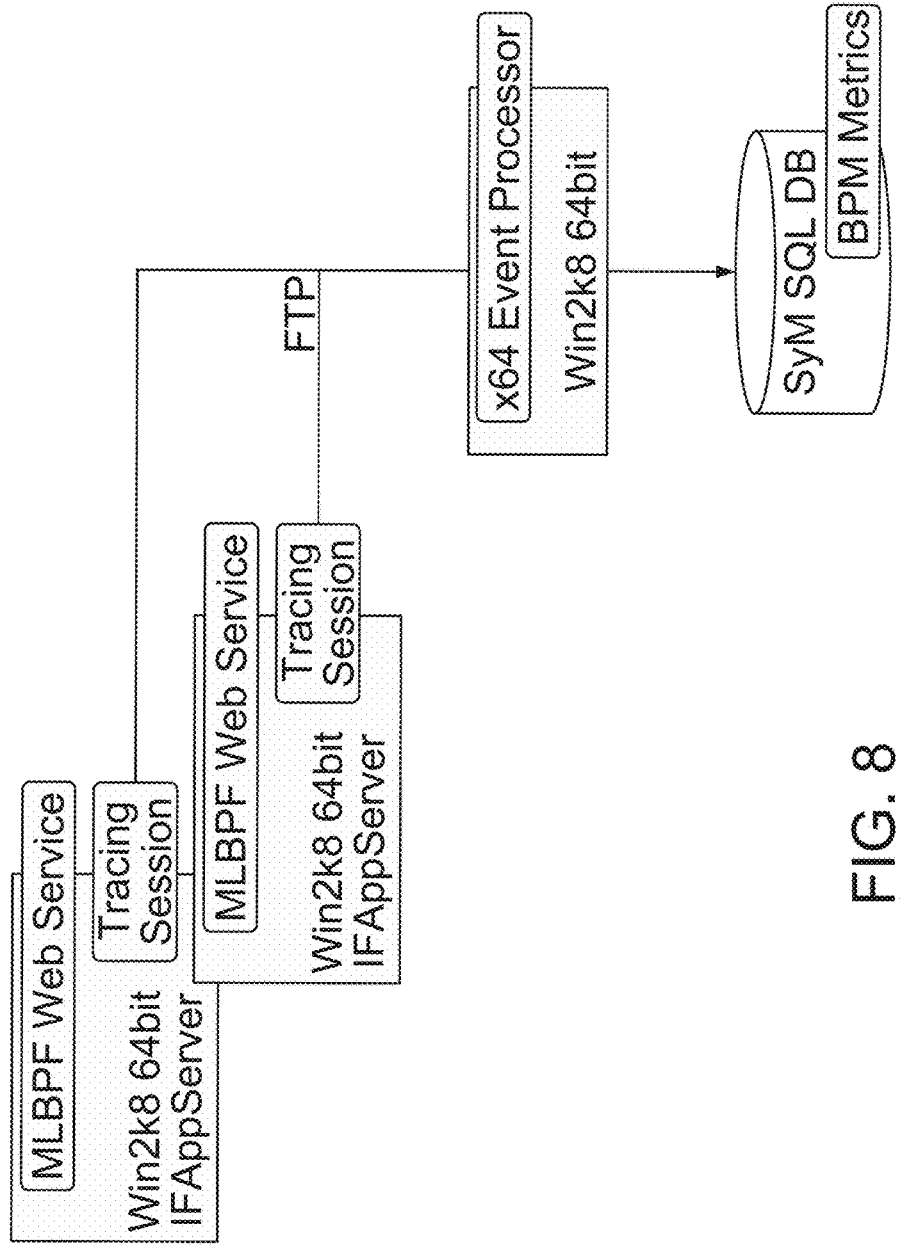
FIG. 8 shows an illustrative business rules framework metrics sub-system according to aspects of the present disclosure.

FIG. 8 shows an illustrative method showing a collection of data by a metrics subsystem according to aspects of the present disclosure. For example, a BPF Metrics Sub-system may collect business process executions in near-real-time along with other correlation information. This metrics data may be used for Business Activity Monitoring (BAM) and Business Intelligence (BI) purposes that ultimately help in process maturity and efficiency. The below diagram may represent the logical architecture on BPM Metrics collection.

In some cases, all activities of the BPF may be logged via asynchronous tracing sessions managed by a security service. These activity events may be flushed to the security server instance for further processing into a database. In some cases, a new data repository instance can be created on the data repository for BPM Metrics collection purposes. In some cases, a dependency may exist for related to 64-bit servers loaded with a particular operating system. In some cases, there is a dependency on a x64 bit server for the process application store in the business unit to support events raised from x64 bit processes. Secondly, for the initial phase, there is a plan to leverage QSF (existing product supported by the BPM services team).

In some cases, a BPF Groups model may comprise three main aspects as follows:

1) Business Functions—that need to be protected. These business functions may be synonymous to tasks defined in a process model definition. In the execution engine, these business functions may be defined as queues.
2) Groups—that are played by the human resources in an organization to execute a process. These groups may be defined based on the set of business processes modeled within an organizational unit. For instance, a business unit may have a set of groups defined for all its business processes.
3) Access Control List—this list encompasses all possible actions a role can perform on a given business function. This list may include of View, Edit, Complete, Assign/Reassign, Terminate and Cancel.

A given Group can have access to zero or multiple Business Functions (Queue) at varying access levels. The ML BPF provides admin tool (UI and batch) to configure and manage these BPF Groups at each org unit level. In some cases a business process framework to a business process management application may include a Process Model Definition that states that an application team may work closely with the BPM Services team to define the necessary processes. As part of this definition, there may be two XML driven templates will be filled out—one to define the process attributes that are necessary for filtering and sorting during the runtime querying of work items. The other definition is related to the BPM groups' definition and rules needed to protect and return appropriate work items during runtime work items query. These XML definitions will be input to a tool developed as part of the MLBPF suite. This tool internally updates the corresponding DB accordingly.

Run Time Execution:

During runtime, the applications may interact with the Web service components either through http request/response protocol either directly from their user interface applications or through a vendor supplied product that may include one or more Java/Unix servers which intern calls the Web service through http. The BPF web service components may talk to the BPF_ProcessWorkItemDB and BPF_BPMGroupsDB to respond to client requests. The interaction between the actual BPM engine and the BPF DBs may be handled by the two NT service components part of the BPF suite namely, BPF_ProcessEventsListnerService and BPF_ProcessInteractionService.

The following section discusses the software and/or hardware dependencies along with system components' touch points in terms of protocol and ports. The BPF_ProcessWS may be a service based on an instance of a web based service. The security server may be protected with necessary provisioning. The server may require a specified operating system, a server clock speed, and/or a definition as to whether a virtual server or a physical server may be used. In some cases, this service may connect to the following databases through an interface application, including BPF_ProcessWorkItemDB and BPF_BPMGroupsDB.

The BPF_WorkItemWS may be connected via a web based interface to a communication office and may comprise an instance of a framework based service. A service interface associated with this application may comprise using a security feature of a product to protect with necessary provisioning. Again the windows operating system may be implemented on a server having a specified installed operating system and/or an indication as to whether a physical server or a virtual server may be used. In many cases, this service may connect to the following databases through an application, such as BPF_ProcessWorkItemDB and/or BPF_BPMGroupsDB.

The BPF_ProcessEventsListnerService may comprise a service associated with a particular operating system and/or application package. A design NPL may comprise an Operating system service and/or a programming dll being packaged via the one or more goals. A server may include a Physical or virtual machine with fail over backup, where only one running instance may be processed at any time that connects to the following touch points, where the BPF_ProcessWorkItemDB through port 1433 using based on recent packages. classes. The execution manager may communicate via TCP protocol. The hostname/url, port and topic may be defined by the BPM services team.

The BPF_ProcessInteractionService may comprise an operating system service that depends on an operating system service and a dll associated with the user interface. In some cases, the dll may be packaged and/or delivered by infrastructure team. The Operating system service may require server hardware having a specified version of operating system and/or a specified architecture (e.g., a 640 bit architecture) and may include a failsafe backup. In any event, only one instance may be operating at a time and may connect BPF_ProcessWorkItemDB through a specified port (e.g., port 1433) and may use one or more specified database access classes. Also, the instance may be connected to EMS via TCP protocol. The hostname/url, port and topic may be defined by the BPM services team.

The business process framework may include one or more servers configured to provide a data repository, such as BPF_ProcessWorkItemDB and MLBPF_BPMGroupsDB, where a minimal data base version may be specified, along with a server operating system and architecture (e.g., 64 bit). One or more user interfaces may be defined, such as BPF_AdminUI. This user interface may be programmed using a common language platform, may be securely protected based on rules created for each business unit and may connect to the data repositories, such as BPF_ProcessWorkItemDB and BPF_BPMGroupsDB via a specified port (e.g., tcp port 1433).

In some cases, the BPM components may allow for communicating a process end event being communicated to the affected software applications. A manual work item may be desirable to allow for users to independently step through a process. Further, a system step start and system step end commands may be implemented to improve testing and/or monitoring of the modeled processes. Further, the BPM applications may allow for any event to be used for monitoring (e.g., signaled) the process.

Figure 9:
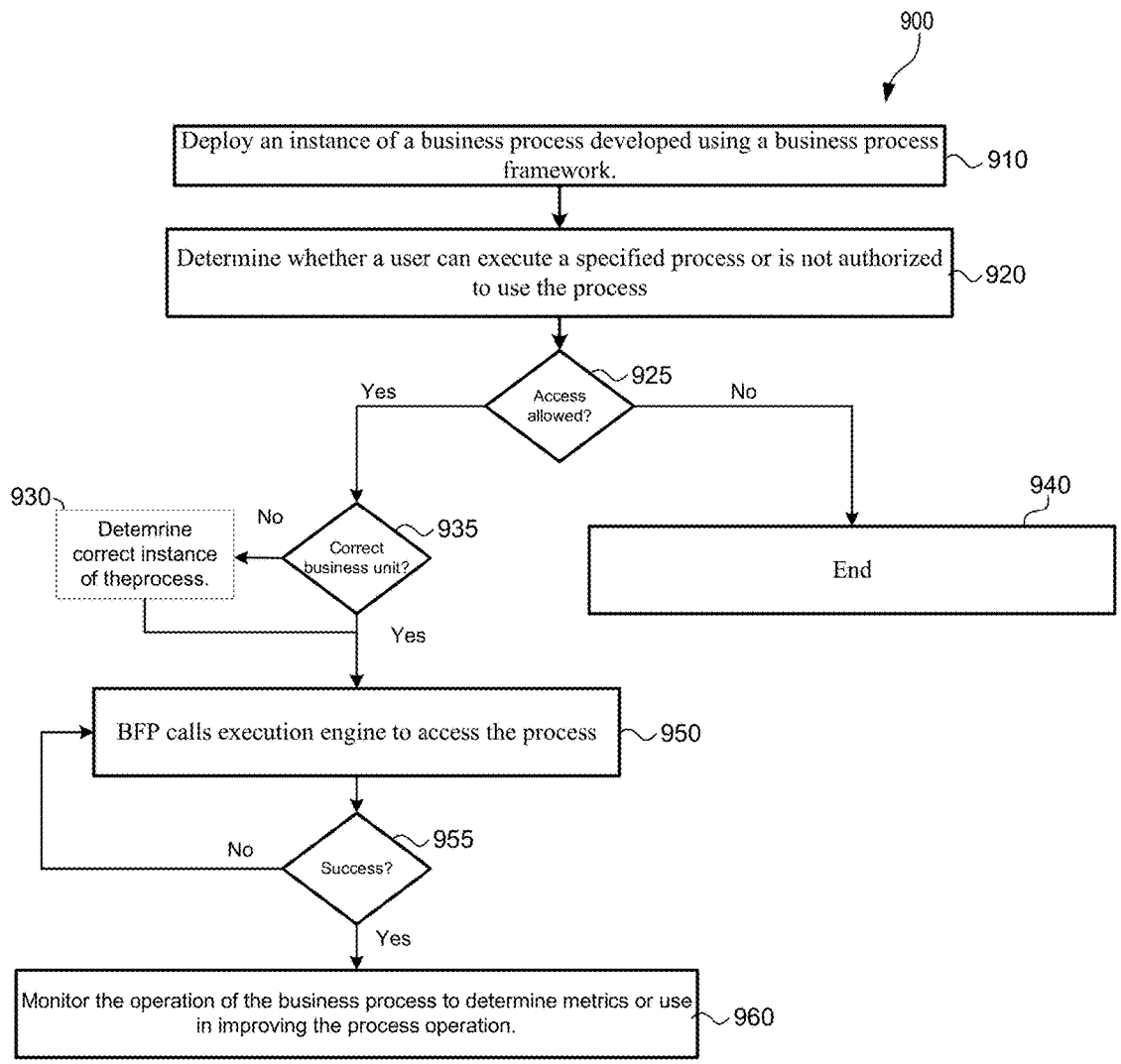
FIG. 9 shows an illustrative method showing a collection of data by a metrics subsystem according to aspects of the present disclosure.

FIG. 9 shows an illustrative method 900 for deploying and executing a business process using the business process framework according to aspects of the present disclosure. At 910, a business process framework is deployed for use in providing an instance of a business process to one or more uses associated with a business unit of a business organization. For example, an instance of a business process is made available to the business unit based on permissions assigned to one or more users of the business unit process. At 920, a user may access the business process instance and attempt to log in based on credentials assigned by the business unit. In some cases, the user may access the user interface via a web-based terminal. At 925, the business process framework, or the underlying business process management system may access a user authentication application, such as a security program, to determine whether the user has permissions to access the business process itself, or a step of the business process currently attempted to be accessed. If not, execution ends at 940. If so, the business process framework determines whether a correct business unit is associated with the process instance being accessed. If not, then at 930, a correct instance of the business process is determined and processing continues at 950. If the correct instance was being accessed at 935, then the business rules framework may initiate the process by calling an execution engine to process a portion of the process 950. If, at 955, the execution engine repeats step 950 and the failure is stored in a monitoring database. Otherwise, when the execution engine successfully executes the process, the a monitoring tool may be used to monitor an operation of the business process instance and record metrics associated with the process operation.

Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment or an embodiment combining software and hardware aspects. For example, a computer-readable medium storing instructions to cause a processor to perform methods in accordance with aspects of the disclosure is contemplated.

While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. A system comprising:
a business process management (BPM) system managing operations of a plurality of business processes and a business process framework (BPF) device providing an interface for managing business processes across a business organization, wherein the BPM system comprises:
an execution engine processing models corresponding to the plurality of business processes; and
a business process modeler device, wherein the business process modeler device generates a business process model based on a representation of a business process generated by a modeling interface of the BPF device; and,
wherein the BPF device comprises a wrapper around the operations of the BPM system and further comprises:
a processor;
a non-transitory memory device communicatively coupled to the processor and storing instructions that, when executed by the processor, cause the BPF device to:
generate, via the modeling interface, at least one user interface screen to facilitate entry of business process information corresponding to the business process;
generate, by the modeling interface, the representation of the business process in a modeling language based on the business process information;
trigger, via a model execution device, execution of the business process model by the execution engine of the BPM system as a process instance, wherein the business process model is based on the representation of the business process generated by the modeling interface;
update the execution engine of the BPM system with process instance information;
monitor, in near real-time by a business rule monitoring device communicatively coupled to the execution engine, an operation of the business process model when executed by the execution engine in response to a process input and a resulting output; and
generate metrics, by a metrics subsystem, the metrics being gathered using a common schema and collection method and corresponding to the operation of the business process model based on business process executions gathered in near real-time that are logged via asynchronous tracing sessions managed by a security service implemented as a persistent security certificate and a dedicated BPM system user identifier requiring a valid user token to make a secured system call.

2. The system of claim 1, wherein the business process modeler device of the BPM system further comprises a model code generator, wherein the model code generator generates the business process model, and wherein the business process model comprises a standardized modeling language.

3. The system of claim 2, wherein the business process model comprises a modeling file generated using business process modeling notation (BPMN) and a process definition file comprising a process definition based on XML process definition language (XPDL).

4. The system of claim 1, wherein the business process modeler device, the execution engine and the business rule monitoring device are provided by a same vendor.

5. The system of claim 1, wherein the business process modeler device, the execution engine and the business rule monitoring device are provided by at least two different vendors.

6. The system of claim 5, wherein the BPF device comprises a user interface server configured to present a plurality of user interface screens to a user, wherein the plurality of user interface screens are formatted to provide a common look and feel to the user regardless of a vendor supplying one or more of the business process modeler device, the execution engine and the business rule monitoring device.

7. The system of claim 5, wherein the BPF further comprises a business model translator configured to translate the business process model when an output of the business process modeler device is incompatible with an input format expected by the execution engine.

8. An apparatus comprising:
a business process management (BPM) system managing operations of a plurality of business processes, wherein the BPM system comprises an execution engine for processing models corresponding to the plurality of business processes, and
a business process framework (BPF) device configured to provide a consistent user interface for managing business processes across a business organization, wherein the BPF is communicatively coupled to the BPM system, and wherein the BPF comprises:
a processor;
a non-transitory memory device communicatively coupled to the processor and storing instructions that, when executed by the processor, cause the BPF device to:
generate, via a modeling interface, at least one user interface screen to facilitate entry of business process information corresponding to a business process;
generate, by the modeling interface, a representation of the business process in a modeling language based on the business process information; and
trigger, via a model execution device, execution of a business process model by the execution engine of the BPM system wherein the business process model is based on the representation of the business process generated by the modeling interface; and
a business rule monitoring device, wherein the business rule monitoring device is communicatively coupled to the execution engine and processes instructions that cause the business rule monitoring device to:
monitor, in near real-time via a network, an operation of the business process model when executed by the execution engine in response to a process input and a resulting output;
generate metrics by a metrics subsystem using a common schema and collection method, the metrics corresponding to the operation of the business process model based on business process executions gathered in near real-time that are logged via asynchronous tracing sessions managed by a security service implemented as a persistent security certificate and a dedicated BPM system user identifier requiring a valid user token to make a secured system call; and
update the execution engine of the BPM with process instance information associated with the operation of the business process model.

9. The apparatus of claim 8 wherein the BPF device comprises a wrapper around the operations of the BPM system.

10. The apparatus of claim 8, wherein the BPM system further comprises a model code generator, wherein the model code generator generates the business process model based on the business process information, wherein the business process model corresponds to a standardized modeling language.

11. The apparatus of claim 10, wherein the business process model comprises a modeling file generated using business process modeling notation (BPMN) and a process definition file comprising a process definition based on XML process definition language (XPDL).

12. The apparatus of claim 8, wherein the BPM system further comprises a business process modeler device, wherein the business process modeler device generates the business process model based on the representation of the business process generated by the modeling interface of the BPF device.

13. The apparatus of claim 8, wherein the BPM system further comprises a business process modeler device and a business rule monitoring device, wherein the business process modeler device, the execution engine and the business rule monitoring device are provided by a same vendor.

14. The apparatus of claim 8, wherein the BPM system further comprises a business process modeler device and a business rule monitoring device, wherein the business process modeler device, the execution engine and the business rule monitoring device are provided by at least two different vendors.

15. The apparatus of claim 14, wherein the BPF device comprises a user interface server configured to present a plurality of user interface screens to a user, wherein the plurality of user interface screens are formatted to provide a common look and feel to the user regardless of a vendor supplying one or more of the business process modeler device, the execution engine and the business rule monitoring device.

16. The apparatus of claim 14, wherein the BPF device further comprises a business model translator configured to translate the business process model when an output of the business process modeler device is incompatible with an input format expected by the execution engine.

17. A method comprising:
presenting, by a user interface of a business process framework (BPF), at least one user interface screen to facilitate entry of information corresponding to an operation of a business process;
generating, by a model interface device of the BPF, a standardized representation of the business process using business process modeling notation (BPMN) and XML process definition language (XPDL);
communicating, by the BPF, the standardized representation of the business process to a modeler device of a business process management (BPM) system, wherein the BPF comprises a wrapper around the BPM system and provides a vendor agnostic user interface to the BPM system;
triggering, by an execution interface of the BPF, an execution engine of the BPM system to process an instance of a business process model corresponding to the business process;
monitoring, in near real-time via a network, an operation of the business process model when executed by the execution engine in response to a process input and a resulting output; and
generating a set of business process metrics by a metrics subsystem using a common schema and collection method, the metrics corresponding to the operation of the business process model based on business process executions gathered in near real-time that are logged via asynchronous tracing sessions managed by a security service implemented as a persistent security certificate and a dedicated BPM system user identifier requiring a valid user token to make a secured system call; and presenting, by the BPF via one or more user interface screens a visual indication of the set of business process metrics corresponding to the operation of the business process model when executed by the execution engine.

* * * * *